United States Patent
Saito et al.

(10) Patent No.: US 11,424,696 B2
(45) Date of Patent: Aug. 23, 2022

(54) MOTOR DRIVE DEVICE

(71) Applicant: FANUC CORPORATION, Minamitsuru-gun (JP)

(72) Inventors: Sou Saito, Yamanashi-ken (JP); Tsutomu Shikagawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/081,460

(22) Filed: Oct. 27, 2020

(65) Prior Publication Data
US 2021/0135604 A1  May 6, 2021

(30) Foreign Application Priority Data

Oct. 30, 2019 (JP) .............................. JP2019-196827

(51) Int. Cl.
*H02P 3/14* (2006.01)

(52) U.S. Cl.
CPC ...................................... *H02P 3/14* (2013.01)

(58) Field of Classification Search
CPC .... H02H 7/16; H02H 3/20; H02H 9/04; H02J 7/345; H02J 3/383; G01R 31/00; H02M 7/48; H02M 1/32; H02P 29/025; H02P 27/06
See application file for complete search history.

(56) References Cited

U.S. PATENT DOCUMENTS

2016/0315575 A1   10/2016  Yamamoto et al.
2017/0222596 A1*  8/2017  Kuroki .................... H02P 27/08

FOREIGN PATENT DOCUMENTS

| JP | H03-3697 A | 1/1991 |
| JP | 2000-139082 A | 5/2000 |
| JP | 2015-107045 A | 6/2015 |
| JP | 2016208773 A | 12/2016 |
| JP | 2017/024137 A | 2/2017 |
| JP | 2017-135955 A | 8/2017 |
| WO | WO-2013114602 A1 * | 8/2013 ............... B66B 5/02 |

* cited by examiner

*Primary Examiner* — Said Bouziane
(74) *Attorney, Agent, or Firm* — McGinn IP Law Group, PLLC

(57) ABSTRACT

A motor drive device includes: a converter converting an AC voltage supplied from an AC power supply into a DC voltage; a smoothing capacitor smoothing the DC voltage output from the converter; an inverter converting the DC voltage smoothed by the smoothing capacitor into an AC voltage to drive a motor; a regenerative circuit that is disposed between the smoothing capacitor and the inverter, includes a first resistor and a first switch, and short-circuits the ends of the smoothing capacitor through the first resistor by turning on the first switch; and a control unit keeping the first switch in the OFF state during an emergency stop.

18 Claims, 16 Drawing Sheets

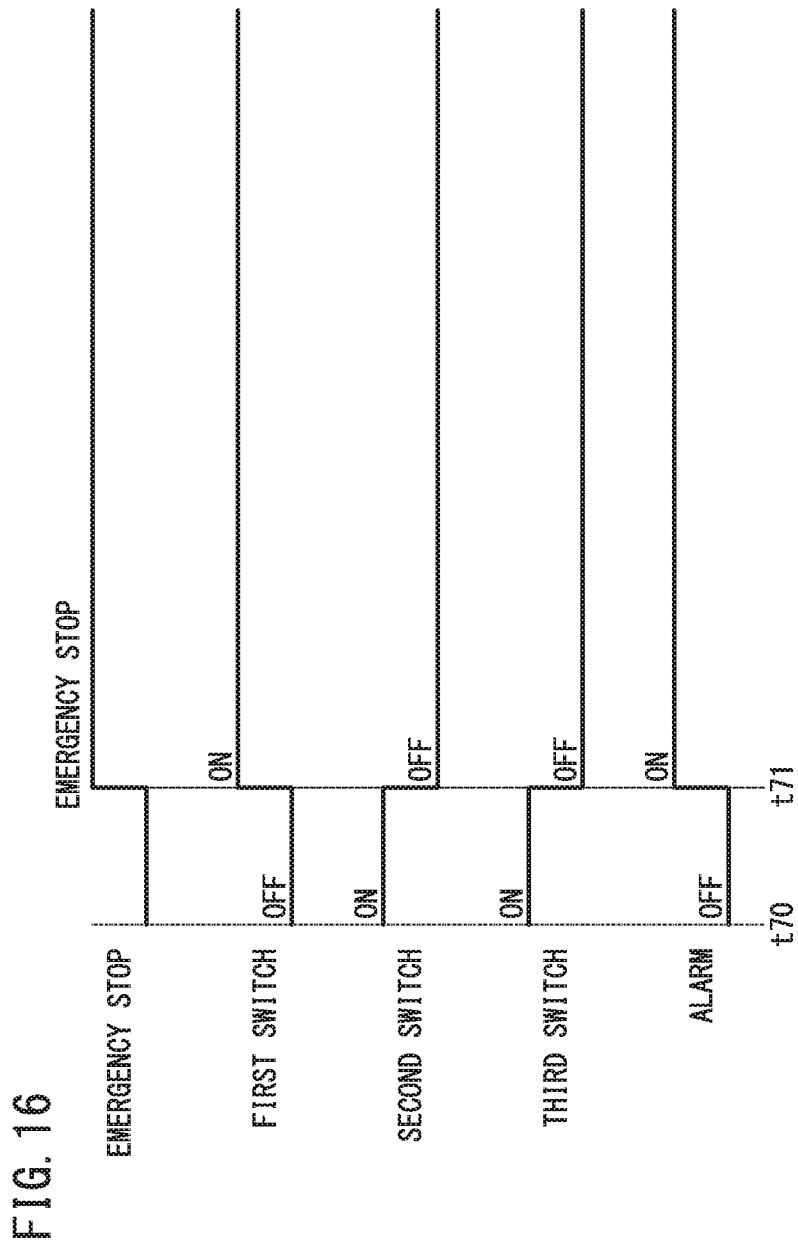

MOTOR DRIVE DEVICE

CROSS-REFERENCE TO RELATED APPLICATION

This application is based upon and claims the benefit of priority from Japanese Patent Application No. 2019-196827 filed on Oct. 30, 2019, the contents of which are incorporated herein by reference.

BACKGROUND OF THE INVENTION

Field of the Invention

The present invention relates to a motor drive device.

Description of the Related Art

Japanese Laid-Open Patent Publication No. 03-003697 discloses a motor drive device including a regenerative circuit configured by connecting a resistor and a transistor in series. In Japanese Laid-Open Patent Publication No. 03-003697, when the motor is stopped, the transistor is turned on so that a regenerative current flows through the resistor, the transistor and the like and the electric power is consumed through the resistor.

SUMMARY OF THE INVENTION

However, in the configuration disclosed in Japanese Laid-Open Patent Publication No. 03-003697, the regenerative circuit receives serious damage when emergency stops and the like are frequently actuated.

It is therefore an object of the present invention to provide a motor drive device capable of suppressing damage to a regenerative circuit and the like.

A motor drive device according to one aspect of the present invention includes: a converter configured to convert an alternating current (AC) voltage supplied from an AC power supply into a direct current (DC) voltage; a smoothing capacitor configured to smooth the DC voltage output from the converter; an inverter configured to convert the DC voltage smoothed by the smoothing capacitor into an AC voltage to drive a motor; a regenerative circuit that is disposed between the smoothing capacitor and the inverter, includes a first resistor and a first switch, and is configured to short-circuit ends of the smoothing capacitor through the first resistor by turning on the first switch; and a control unit configured to keep the first switch in an OFF state during an emergency stop.

According to the present invention, it is possible to provide a motor drive device capable of suppressing damage to a regenerative circuit and the like.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 16 is a time chart showing an example of the operation of the motor drive device according to the embodiment.

DESCRIPTION OF THE PREFERRED EMBODIMENTS

A motor drive device according to the present invention will be described in detail below in connection with a preferred embodiment with reference to the accompanying drawings.

Embodiment

Figure 1:
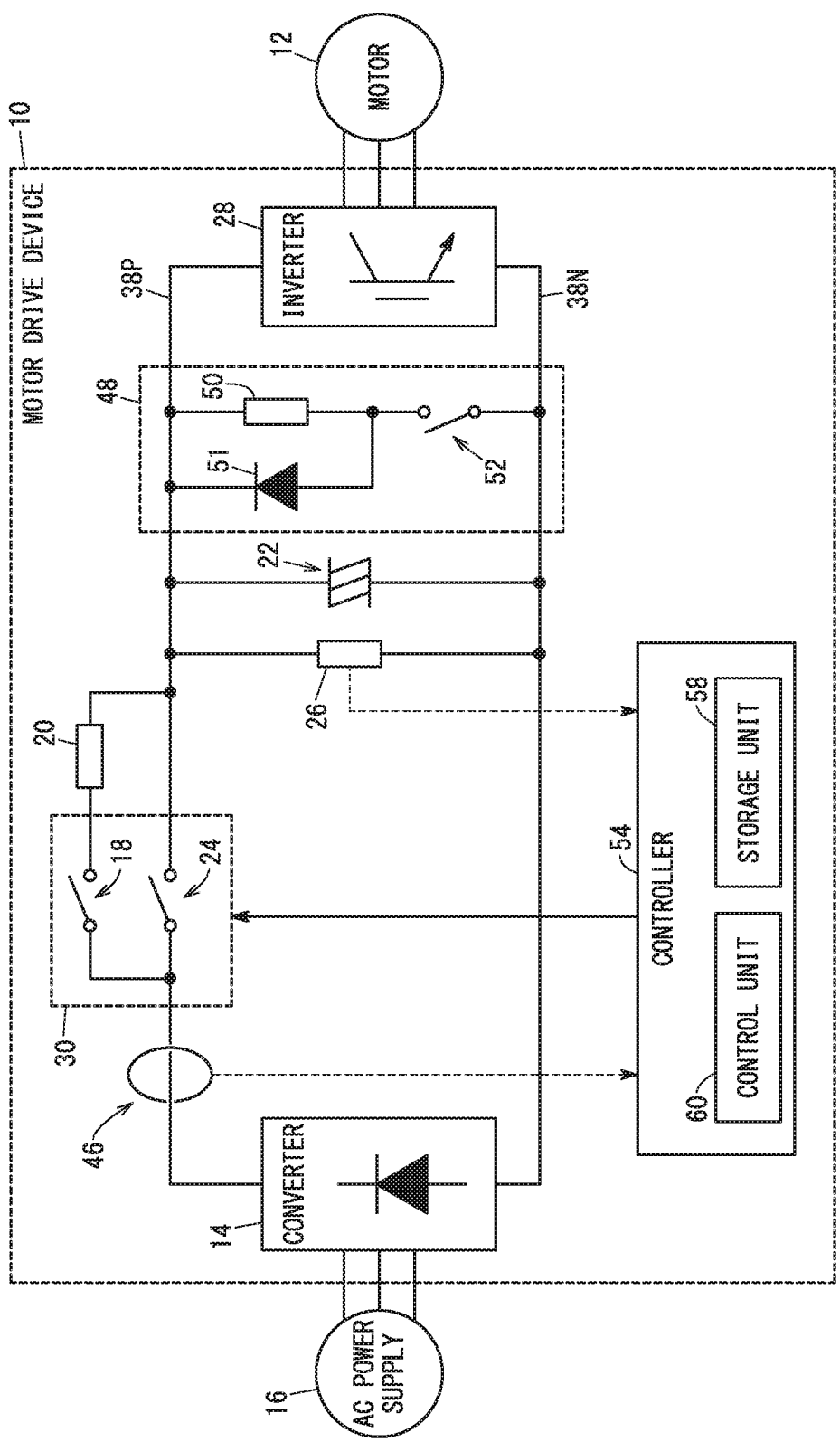
FIG. 1 is a diagram showing a configuration of a motor drive device according to an embodiment.

A motor drive device according to one embodiment will be described with reference to FIGS. 1 to 16. FIG. 1 is a diagram showing a configuration of a motor drive device according to the present embodiment.

A motor drive device 10 according to the present embodiment can drive a motor 12. The motor 12 is, for example, a three-phase motor, but is not limited to this.

The motor drive device 10 includes a converter 14. The converter 14 converts an AC voltage supplied from an AC power supply 16 into a DC voltage. The converter 14 is, for example, a known pulse width modulation (PWM) converter, but is not limited to this.

The AC power supply 16 supplies AC power to the motor drive device 10. The AC power supply 16 is, for example, a three-phase AC power supply, but is not limited to this.

The motor drive device 10 further includes a smoothing capacitor 22. The smoothing capacitor 22 is arranged between the converter 14 and an inverter 28 described later. The smoothing capacitor 22 smooths the DC voltage output from the converter 14. The output terminal on the positive electrode side of the converter 14 is connected to a first end of the smoothing capacitor 22 via a wiring 38P. The output terminal on the negative electrode side of the converter 14 is electrically connected to a second end of the smoothing capacitor 22 via a wiring 38N.

The motor drive device 10 further includes a voltage detection unit (DC voltage sensor, DC voltage detector) 26. The voltage detection unit 26 can detect a DC voltage between the first end of the smoothing capacitor 22 and the second end of the smoothing capacitor 22. The voltage detection unit 26 supplies a signal corresponding to the DC voltage between the first end of the smoothing capacitor 22 and the second end of the smoothing capacitor 22 to a controller 54 described later.

The motor drive device 10 further includes the inverter (inverter circuit) 28. The DC voltage supplied from the converter 14 is supplied to the inverter 28 via the wirings 38P and 38N. The inverter 28 converts the DC voltage supplied from the converter 14 into an AC voltage, and supplies the AC voltage to the motor 12, whereby the motor 12 can be driven.

The motor drive device 10 further includes a current detection unit (current sensor, current detector) 46. The current detection unit 46 is provided on, for example, the wiring 38P. The current detection unit 46 can detect the current supplied from the AC power supply 16 to the smoothing capacitor 22. The current detection unit 46 supplies a signal corresponding to the current supplied from the AC power supply 16 to the smoothing capacitor 22, to the controller 54 described later.

The motor drive device 10 further includes a regenerative circuit (dynamic brake circuit) 48. The regenerative circuit 48 can short-circuit the ends of the smoothing capacitor 22 by a first resistor 50 described later, to dissipate the electric power accumulated in the smoothing capacitor 22 as heat. This makes it possible to stop the motor 12 more quickly. The regenerative circuit 48 is electrically connected to the wirings 38P and 38N.

The regenerative circuit 48 includes the first resistor (regenerative resistor) 50. A first end of the first resistor 50 is electrically connected to the wiring 38P.

The regenerative circuit 48 further includes a first switch 52. The first switch 52 may be formed of, for example, an insulated gate bipolar transistor (IGBT) or the like, but is not limited to this. A first end of the first switch 52 is electrically connected to a second end of the first resistor 50. A second end of the first switch 52 is electrically connected to the wiring 38N.

A diode 51 is connected in parallel with the first resistor 50. The cathode of the diode 51 is electrically connected to the first end of the first resistor 50. The anode of the diode 51 is electrically connected to the second end of the first resistor 50.

When the first switch 52 is off, that is, when the first switch 52 is open, both ends of the smoothing capacitor 22 are not short-circuited. When the first switch 52 is on, that is, when the first switch 52 is closed, both ends of the smoothing capacitor 22 are short-circuited via the first resistor 50.

The motor drive device 10 further includes a switch unit 30 and a second resistor 20. The switch unit 30 is to turn on and off the electric power supplied from the AC power supply 16 to the smoothing capacitor 22. The switch unit 30 includes a second switch 24 and a third switch 18. The second switch 24 is provided on the wiring 38P. A first end of the second switch 24 is electrically connected to the converter 14 via the wiring 38P. A second end of the second switch 24 is electrically connected to the first end of the smoothing capacitor 22 via the wiring 38P. A series of the third switch 18 and the second resistor 20 is connected in parallel with the second switch 24. A first end of the third switch 18 is electrically connected to a first end of the second resistor 20. A second end of the third switch 18 is electrically connected to the first end of the second switch 24. A second end of the second resistor 20 is electrically connected to the second end of the second switch 24. By turning off both the second switch 24 and the third switch 18, the switch unit 30 is turned off.

When the second switch 24 is kept in the OFF state and the third switch 18 is turned on, the DC voltage output from the converter 14 starts to be supplied to the smoothing capacitor 22 via the second resistor 20. Since current is supplied to the smoothing capacitor 22 via the second resistor 20, it is possible to prevent a large inrush current from flowing into the smoothing capacitor 22. After the smoothing capacitor 22 is sufficiently charged, that is, after the voltage across the smoothing capacitor 22 becomes sufficiently high, the second switch 24 is closed. The process of charging the smoothing capacitor 22 via the second resistor 20 while keeping the second switch 24 in the OFF state is referred to as the initial charging process.

The motor drive device 10 further includes the controller 54. The controller 54 governs the whole motor drive device 10. The controller 54 includes a control unit 60 and a storage unit 58. The control unit 60 can be configured by, for example, a central processing unit (CPU) or the like, but is not limited to this. The storage unit 58 includes, for example, an unillustrated volatile memory and an unillustrated non-volatile memory. Examples of the volatile memory include random access memory (RAM). Examples of the non-volatile memory include read only memory (ROM) and flash memory. Programs, data, etc. can be stored in the storage unit 58.

The control unit 60 can control opening/closing of the first switch 52, the second switch 24, and the third switch 18. The control unit 60 keeps the first switch 52 in the OFF state during an emergency stop.

The control unit 60 can stop the motor 12 in an emergency. When the user gives an emergency stop instruction, the control unit 60 causes the motor 12 to make an emergency stop. The emergency stop instruction can be issued by operating, for example, an unillustrated emergency stop button, but is not limited to this. When the user gives an instruction to cancel the emergency stop, the control unit 60 cancels the emergency stop.

Description herein will be made by giving an example in which the motor 12 is stopped in an emergency based on an instruction from the user, but the present invention is not limited to this. The motor 12 may be stopped in an emergency when predetermined conditions are satisfied without an instruction from the user. In this case, the emergency stop can be canceled when the predetermined conditions becomes unsatisfied.

The control unit 60 may keep the switch unit 30 in the ON state during an emergency stop so that the converter 14 continues to supply current to the smoothing capacitor 22. At this time, only the second switch 24 may be kept in the ON state, or both the second switch 24 and the third switch 18 may be kept in the ON state. If the state where the current is supplied to the smoothing capacitor 22 is kept, the initial charging process is not needed after the emergency stop is canceled, and thus the motor 12 can be quickly driven again.

When keeping the state where the current is supplied from the converter 14 to the smoothing capacitor 22 during an emergency stop, if a short circuit failure occurs in the regenerative circuit 48 or the inverter 28, a large current continues to be supplied from the converter 14 to the regenerative circuit 48 or the inverter 28. Since this state is not preferable, the control unit 60 performs the following control. That is, when a current value detected by the current detection unit 46 during an emergency stop is equal to or higher than a current threshold, the control unit 60 turns off the switch unit 30 so that no current is supplied from the converter 14 to the smoothing capacitor 22, and turns on the first switch 52.

The control unit 60 may turn off the switch unit 30 at the time of emergency stop so that no current is supplied from the converter 14 to the smoothing capacitor 22. That is, the control unit 60 may turn off the second switch 24 and the third switch 18 at the time of emergency stop so that current is not supplied from the converter 14 to the smoothing capacitor 22.

When control is made so that no current is supplied from the converter 14 to the smoothing capacitor 22 during an emergency stop, the control unit 60 can control as follows. That is, when the emergency stop is canceled and a voltage value detected by the voltage detection unit 26 is equal to or higher than a voltage threshold, the control unit 60 turns on the second switch 24. That is, the control unit 60 turns on the second switch 24 without executing the initial charging process. This is because, when the voltage value detected by the voltage detection unit 26 is equal to or higher than the voltage threshold, no large inrush current flows into the smoothing capacitor 22 even if the second switch 24 is turned on immediately. Since the initial charging process is not needed after the emergency stop is canceled, the motor 12 can be quickly driven again. On the other hand, when the emergency stop is canceled and the voltage value detected by the voltage detection unit 26 is lower than the voltage threshold, the control unit 60 keeps the second switch 24 in the OFF state and turns on the third switch 18 so as to supply current to the smoothing capacitor 22 via the second resistor 20. That is, the control unit 60 executes the initial charging process. This is because, when the voltage value detected by the voltage detection unit 26 is lower than the voltage threshold, current needs to be supplied to the smoothing capacitor 22 via the second resistor 20 in order to prevent a large inrush current from flowing into the smoothing capacitor 22. After the smoothing capacitor 22 has been sufficiently charged, that is, after the voltage across the smoothing capacitor 22 has become sufficiently high, the second switch 24 is turned on.

When, with no current supplied from the converter 14 to the smoothing capacitor 22 at the time of emergency stop, the emergency stop has continued for a first time threshold TH1 or longer, and then the emergency stop is canceled, the control unit 60 can perform the control as follows. That is, the control unit 60 keeps the second switch 24 in the OFF state, and turns on the third switch 18 to supply current to the smoothing capacitor 22 via the second resistor 20. When the emergency stop has continued for the first time threshold TH1 or longer, the voltage across the smoothing capacitor 22 is relatively low. Therefore, in this case, in order to prevent a large inrush current from flowing into the smoothing capacitor 22, current is supplied to the smoothing capacitor 22 via the second resistor 20. After the voltage across the smoothing capacitor 22 becomes sufficiently high, that is, after the smoothing capacitor 22 is sufficiently charged, the second switch 24 is turned on. Whether or not the voltage across the smoothing capacitor 22 has become sufficiently high can be determined based on the DC voltage detected by the voltage detection unit 26, but is not limited to this. Whether or not the voltage across the smoothing capacitor 22 has become sufficiently high can also be determined based on the time from the start of charging the smoothing capacitor 22. When, with no current supplied from the converter 14 to the smoothing capacitor 22 at the time of emergency stop, and the emergency stop is canceled before the lapse of the first time threshold TH1, the control unit 60 does not perform the above control.

When the emergency stop has continued for a second time threshold TH2 or longer with the switch unit 30 turned on, the control unit 60 can perform the following control. That is, the control unit 60 can turn off the switch unit 30 so that no current is supplied from the converter 14 to the smoothing capacitor 22, and turn on the first switch 52. That is, when the emergency stop has continued for the second time threshold TH2 or longer, the control unit 60 turns off the second switch 24 and the third switch 18 so that no current is supplied from the converter 14 to the smoothing capacitor 22, and turns on the first switch 52. When the emergency stop has continued for the second time threshold TH2 or longer with the switch unit 30 turned off, the control unit 60 can perform the following control. That is, the control unit 60 can keep the switch unit 30 in the OFF state so that no current is supplied from the converter 14 to the smoothing capacitor 22, and turn on the first switch 52. That is, when the emergency stop has continued for the second time threshold TH2 or longer, the control unit 60 keeps the second switch 24 and the third switch 18 in the OFF state so that no current is supplied from the converter 14 to the smoothing capacitor 22, and turns on the first switch 52. This is because, for example, when the user leaves after giving an emergency stop instruction, discharging the electric power accumulated in the smoothing capacitor 22 can contribute to safety.

When a predetermined alarm is issued, the control unit 60 can turn off the switch unit 30 so that no current is supplied from the converter 14 to the smoothing capacitor 22, and turn on the first switch 52. This is because, when a predetermined alarm is issued, discharging the electric power accumulated in the smoothing capacitor 22 can contribute to safety.

Figure 2:
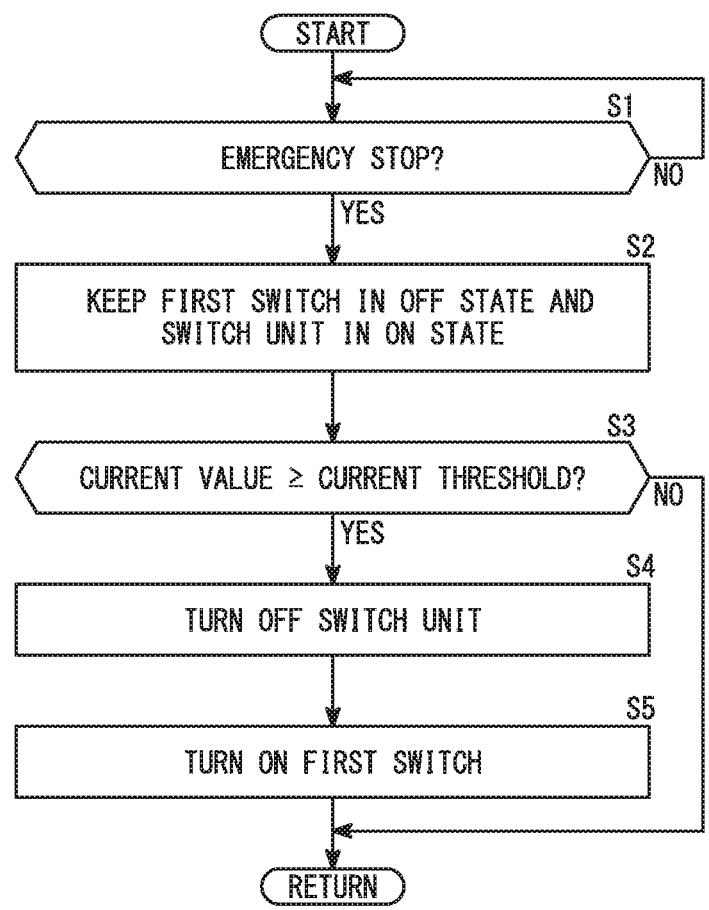
FIG. 2 is a flowchart showing an example of the operation of the motor drive device according to the embodiment.

An example of the operation of the motor drive device 10 during an emergency stop will be described with reference to FIG. 2. FIG. 2 is a flowchart showing an example of the operation of the motor drive device according to the present embodiment. FIG. 2 shows an example in which the switch unit 30 is kept in the ON state during an emergency stop.

At step S1, the control unit 60 determines whether or not an emergency stop is issued. When the emergency stop is issued (YES at step S1), the control proceeds to step S2. When no emergency stop has been issued (NO at step S1), step S1 is repeated.

At step S2, the control unit 60 keeps the first switch 52 in the OFF state and keeps the switch unit 30 in the ON state. That is, the control unit 60 keeps the first switch 52 in the open state and keeps the second switch 24 and the third switch 18 in the closed state. Note that the description herein has been made by giving an example in which the second switch 24 and the third switch 18 are kept in the ON state, but the present invention is not limited to this. The third switch 18 may be turned off while the second switch 24 is kept in the ON state. Then, the control proceeds to step S3.

At step S3, the control unit 60 determines whether or not the current value detected by the current detection unit 46 is equal to or higher than the current threshold. When the current value detected by the current detection unit 46 is equal to or higher than the current threshold (YES at step S3), the control proceeds to step S4. When the current value detected by the current detection unit 46 is lower than the current threshold (NO at step S3), the process shown in FIG. 2 is completed.

At step S4, the control unit 60 turns off the switch unit 30. As a result, no current is supplied from the converter 14 to the smoothing capacitor 22. Then, the control proceeds to step S5.

At step S5, the control unit 60 turns on the first switch 52. This causes discharge of the electric power accumulated in the smoothing capacitor 22. Thus, the process shown in FIG. 2 is completed.

Figure 3:
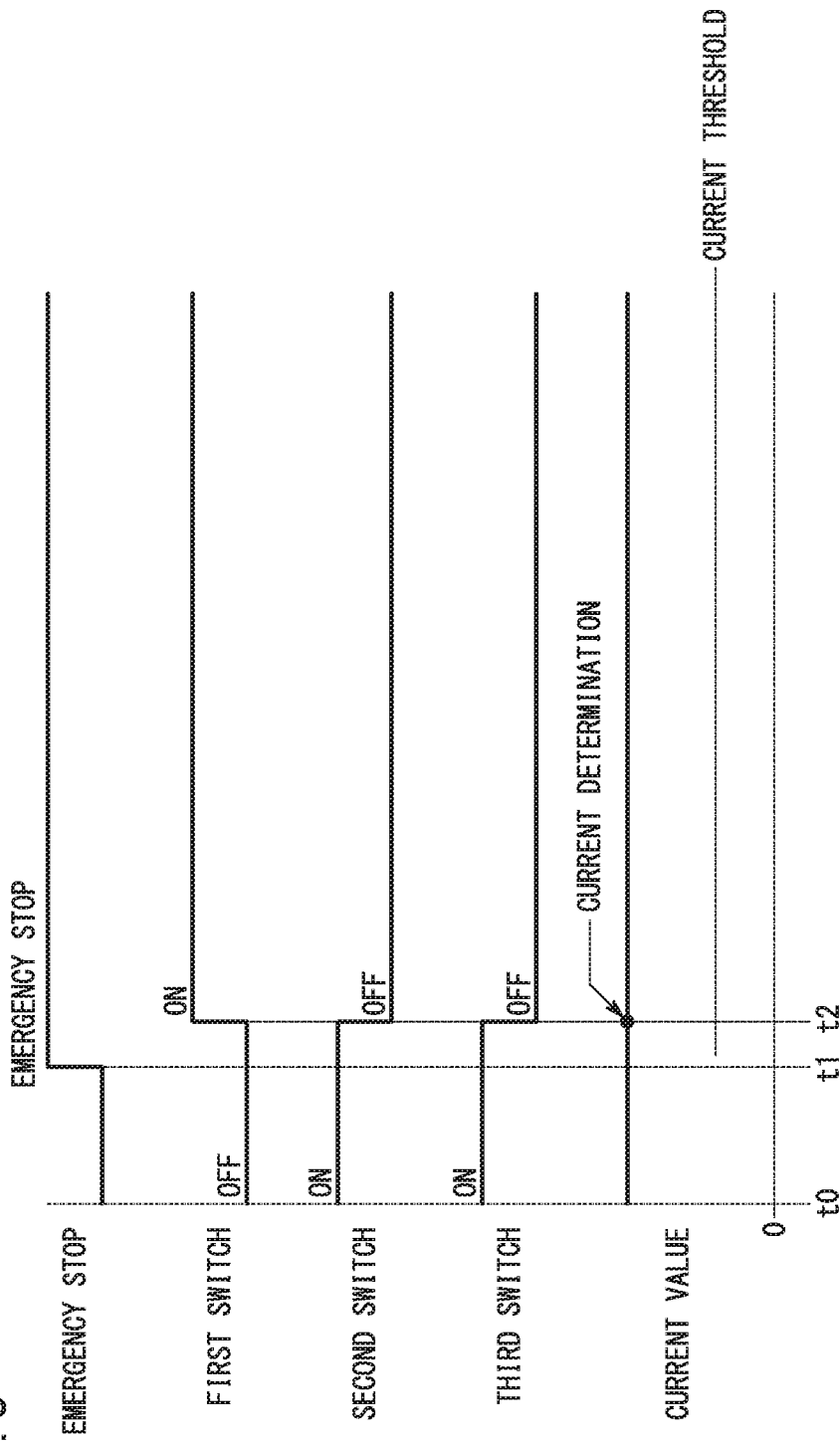
FIG. 3 is a time chart showing an example of the operation of the motor drive device according to the embodiment.

FIG. 3 is a time chart showing an example of the operation of the motor drive device according to the present embodiment. FIG. 3 corresponds to the operation shown in FIG. 2.

At time t0, no emergency stop has been issued. At time t0, the first switch 52 is in the OFF state, while the second switch 24 and the third switch 18 are in the ON state.

Time t1 is the timing at which an emergency stop is started. As shown in FIG. 3, the first switch 52 is kept in the OFF state while the second switch 24 and the third switch 18 are kept in the ON state.

Time t2 is the timing at which the control unit 60 determines whether the current value detected by the current detection unit 46 is equal to or higher than the current threshold. In the example shown in FIG. 3, since the current value detected by the current detection unit 46 is equal to or higher than the current threshold, the first switch 52 is turned on and the second switch 24 and the third switch 18 are turned off.

Figure 4:
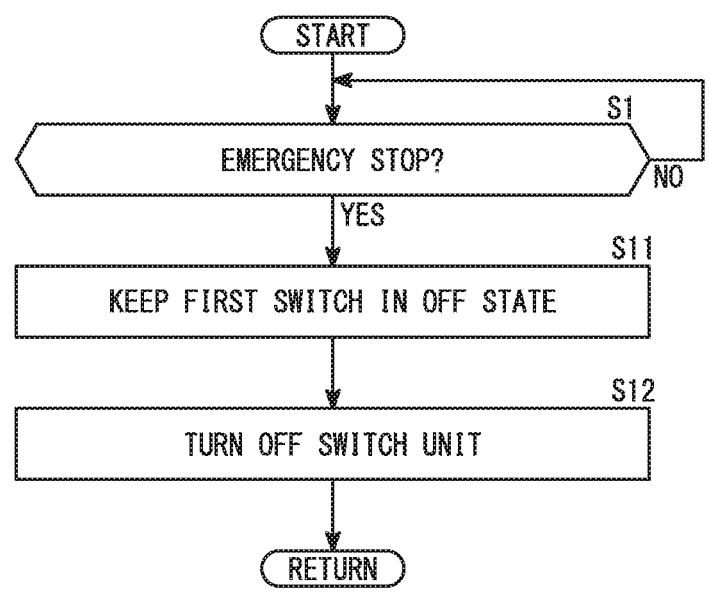
FIG. 4 is a flowchart showing an example of the operation of the motor drive device according to the embodiment.

Referring next to FIG. 4, another example of the operation of the motor drive device 10 during an emergency stop will be described. FIG. 4 is a flowchart showing an example of the operation of the motor drive device according to the present embodiment. FIG. 4 shows a case in which the switch unit 30 is turned off during an emergency stop.

At step S1, the control unit 60 determines whether or not an emergency stop is issued. When an emergency stop has been issued (YES at step S1), the control proceeds to step S2. When no emergency stop has been issued (NO at step S1), step S1 is repeated.

At step S11, the control unit 60 keeps the first switch 52 in the OFF state. That is, the control unit 60 keeps the first switch 52 in the open state. Then, the control proceeds to step S12.

At step S12, the control unit 60 turns off the switch unit 30. As a result, no current is supplied from the converter 14 to the smoothing capacitor 22. In this way, the process shown in FIG. 4 is completed.

Figure 5:
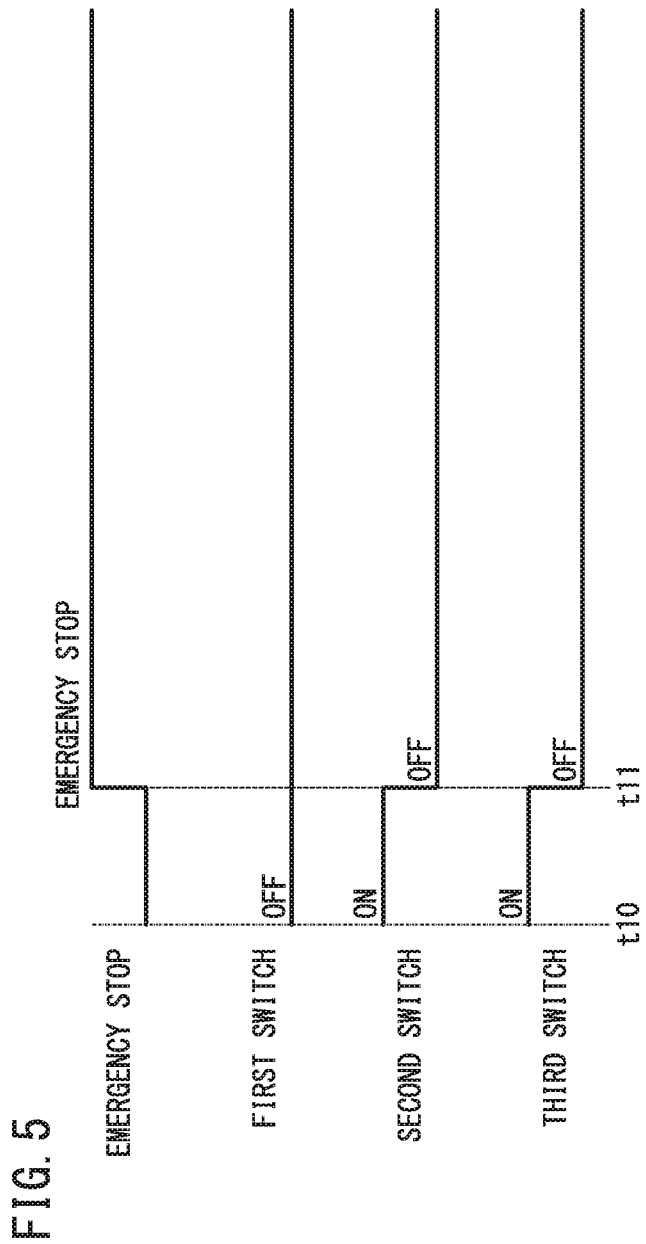
FIG. 5 is a time chart showing an example of the operation of the motor drive device according to the embodiment.

FIG. 5 is a time chart showing an example of the operation of the motor drive device according to the present embodiment. FIG. 5 corresponds to the operation shown in FIG. 4.

At time t10, no emergency stop has been issued. At time t10, the first switch 52 is in the OFF state, while the second switch 24 and the third switch 18 are in the ON state.

Time t11 is the timing at which an emergency stop is started. As shown in FIG. 5, the first switch 52 is kept in the OFF state, and the second switch 24 and the third switch 18 are turned off.

Figure 6:
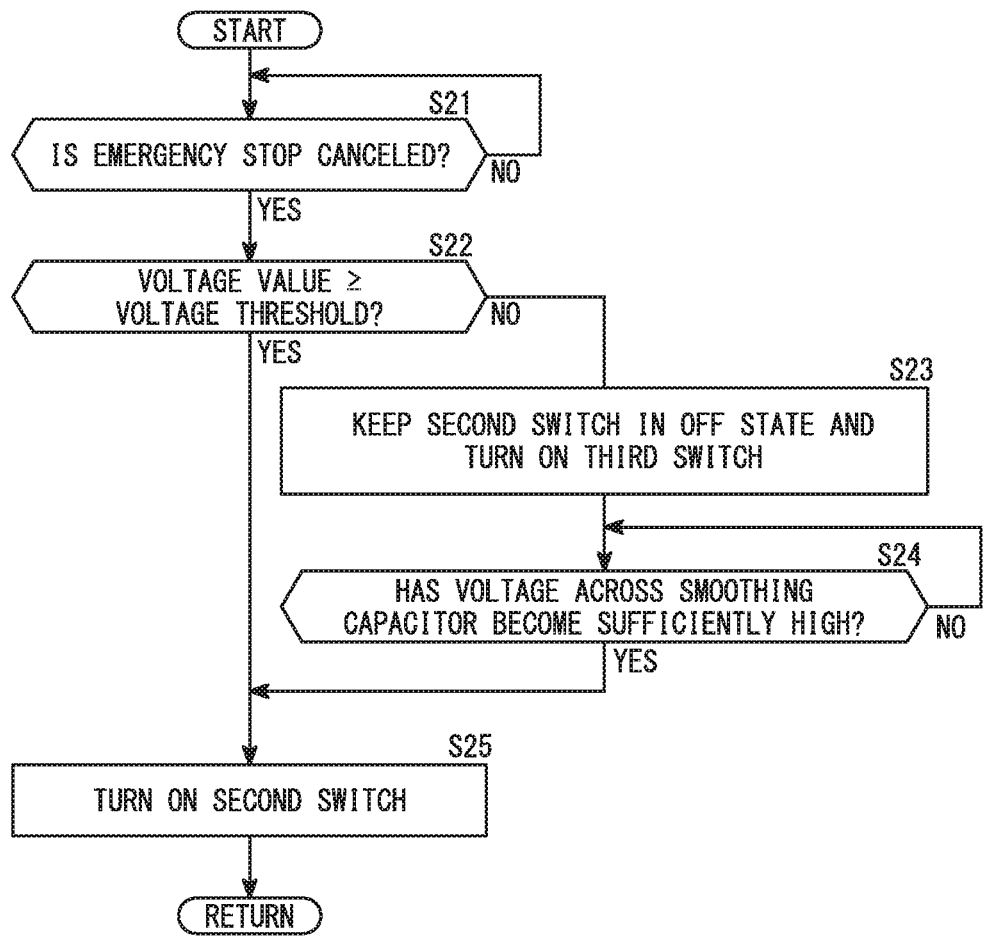
FIG. 6 is a flowchart showing an example of the operation of the motor drive device according to the embodiment.

An example of the operation of the motor drive device 10 when the emergency stop is canceled will be described with reference to FIG. 6. FIG. 6 is a flowchart showing an example of the operation of the motor drive device according to the present embodiment. In the example shown in FIG. 6, the switch unit 30 is turned off during an emergency stop.

At step S21, the control unit 60 determines whether the emergency stop has been canceled. When the emergency stop has been canceled (YES at step S21), the control proceeds to step S22. When the emergency stop has not been canceled (NO at step S21), step S21 is repeated.

At step S22, the control unit 60 determines whether or not the voltage value detected by the voltage detection unit 26 is equal to or higher than the voltage threshold. When the voltage value detected by the voltage detection unit 26 is equal to or higher than the voltage threshold (YES at step S22), the control proceeds to step S25. When the voltage value detected by the voltage detection unit 26 is lower than the voltage threshold (NO at step S22), the control proceeds to step S23.

At step S23, the control unit 60 keeps the second switch 24 in the OFF state and turns on the third switch 18. As a result, current is supplied to the smoothing capacitor 22 via the second resistor 20. Then, the control proceeds to step S24.

At step S24, the control unit 60 determines whether or not the voltage across the smoothing capacitor 22 has become sufficiently high. When the voltage across the smoothing capacitor 22 has become sufficiently high (YES at step S24), the control proceeds to step S25. When the voltage across smoothing capacitor 22 has not been sufficiently high (NO at step S24), step S24 is repeated.

At step S25, the control unit 60 turns on the second switch 24. As a result, current is supplied to the smoothing capacitor 22 without passing through the second resistor 20. The third switch 18 may be kept in the OFF state or turned on. Description herein will be made by giving an example in which the third switch 18 is turned on. When step S25 is completed, the process shown in FIG. 6 is completed.

Figure 7:
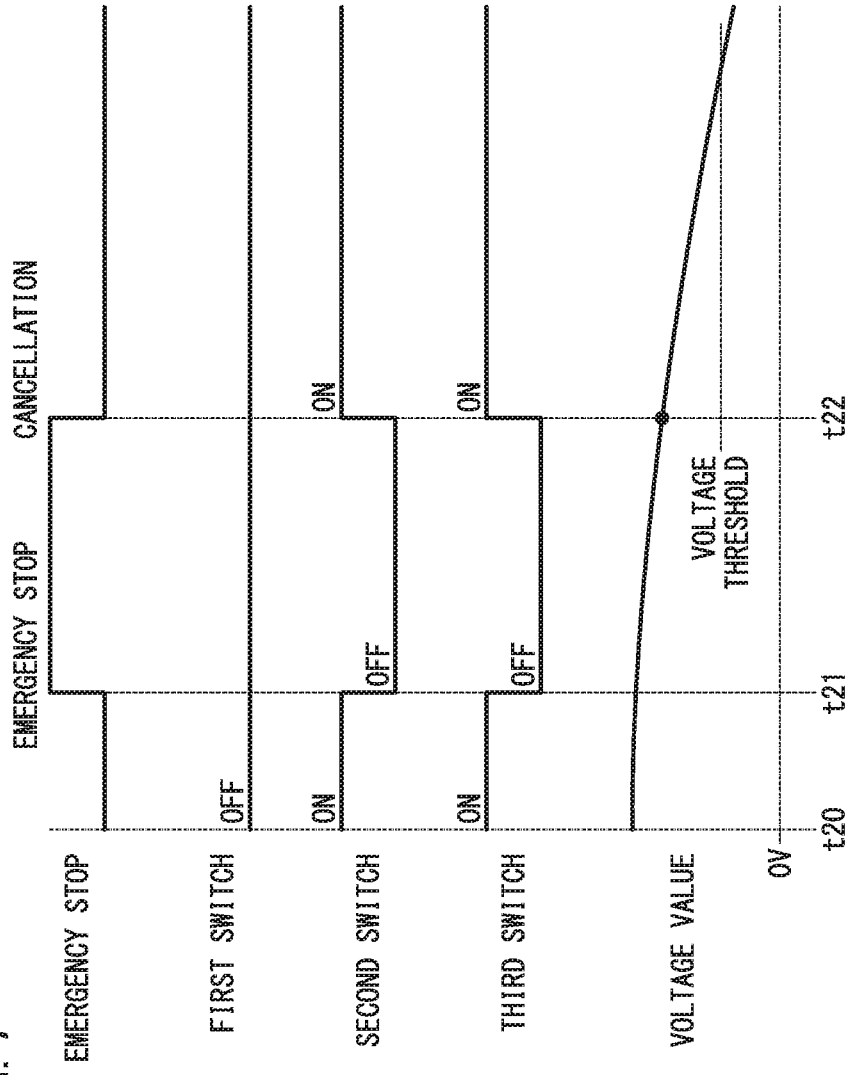
FIG. 7 is a time chart showing an example of the operation of the motor drive device according to the embodiment.

FIG. 7 is a time chart showing an example of the operation of the motor drive device according to the present embodiment. FIG. 7 corresponds to the operation shown in FIG. 6. FIG. 7 shows an example in which the voltage value when the emergency stop is canceled is equal to or higher than the voltage threshold.

At time t20, no emergency stop has been issued. At time t20, the first switch 52 is in the OFF state, while the second switch 24 and the third switch 18 are in the ON state.

Time t21 is the timing at which an emergency stop is started. As shown in FIG. 7, the first switch 52 is kept in the OFF state, and the second switch 24 and the third switch 18 are turned off.

Time t22 is the timing at which the emergency stop is canceled. When the emergency stop is canceled, the control unit 60 determines whether or not the voltage value detected by the voltage detection unit 26 is equal to or higher than the voltage threshold. In the example shown in FIG. 7, since the voltage value detected by the voltage detection unit 26 is equal to or higher than the voltage threshold, the second switch 24 is turned on. As described above, the third switch 18 may be turned on or kept in the OFF state. In the example shown in FIG. 7, the third switch 18 is turned on.

Figure 8:
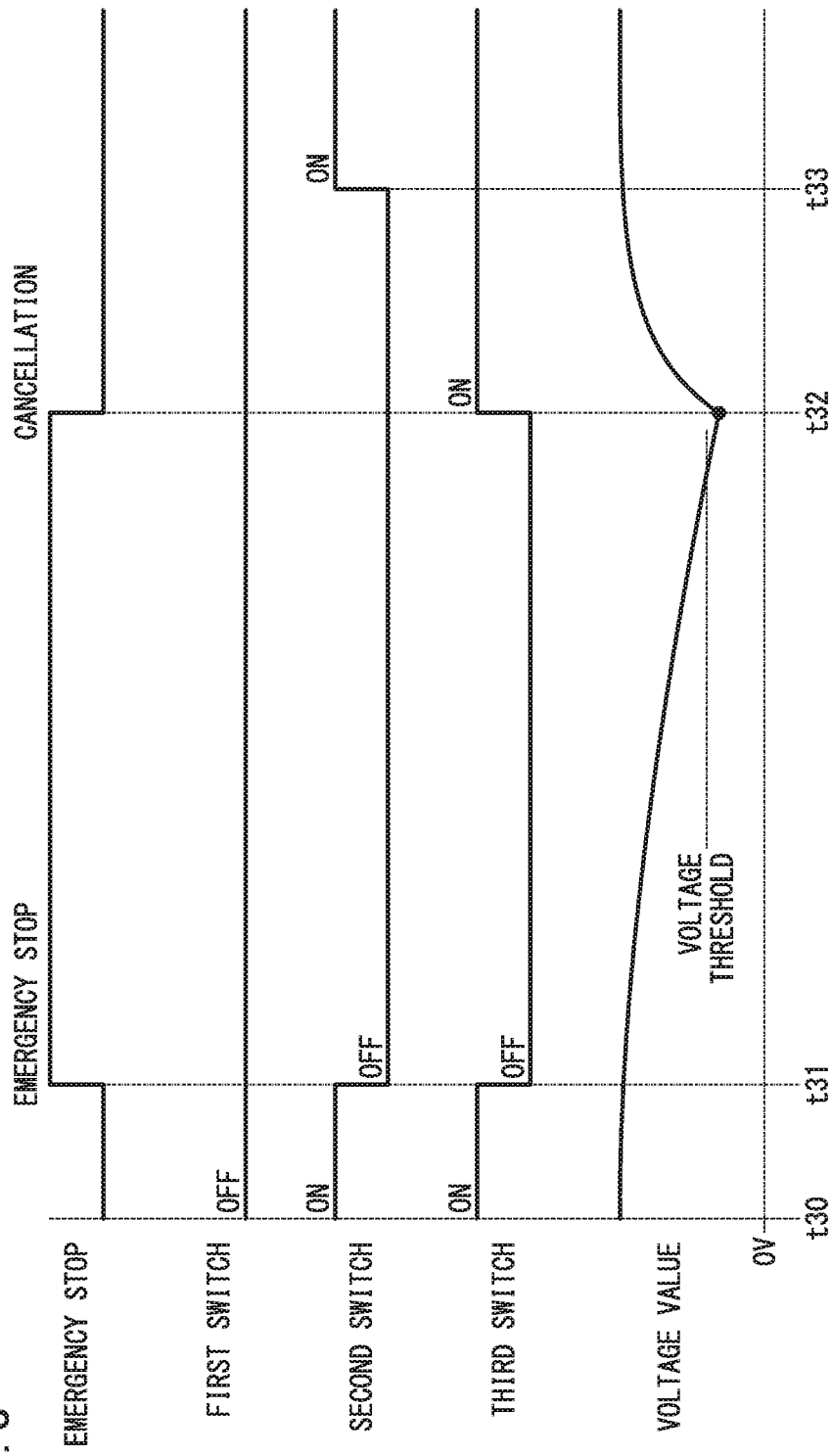
FIG. 8 is a time chart showing an example of the operation of the motor drive device according to the embodiment.

FIG. 8 is a time chart showing an example of the operation of the motor drive device according to the present embodiment. FIG. 8 corresponds to the operation shown in FIG. 6. FIG. 8 shows an example in which the voltage value when the emergency stop is canceled is lower than the voltage threshold.

At time t30, no emergency stop has been issued. At time t30, the first switch 52 is in the OFF state, while the second switch 24 and the third switch 18 are in the ON state.

Time t31 is the timing at which an emergency stop is started. As shown in FIG. 8, the first switch 52 is kept in the OFF state, and the second switch 24 and the third switch 18 are turned off.

Time t32 is the timing at which the emergency stop is canceled. When the emergency stop is canceled, the control unit 60 determines whether or not the voltage value detected by the voltage detection unit 26 is equal to or higher than the voltage threshold. In the example shown in FIG. 8, since the voltage value detected by the voltage detection unit 26 is lower than the voltage threshold, the third switch 18 is turned on. As a result, current starts to be supplied to the smoothing capacitor 22 via the second resistor 20.

Time t33 is the timing at which the voltage across the smoothing capacitor 22 becomes sufficiently high. When the voltage across the smoothing capacitor 22 becomes sufficiently high, the second switch 24 is turned on.

Figure 9:
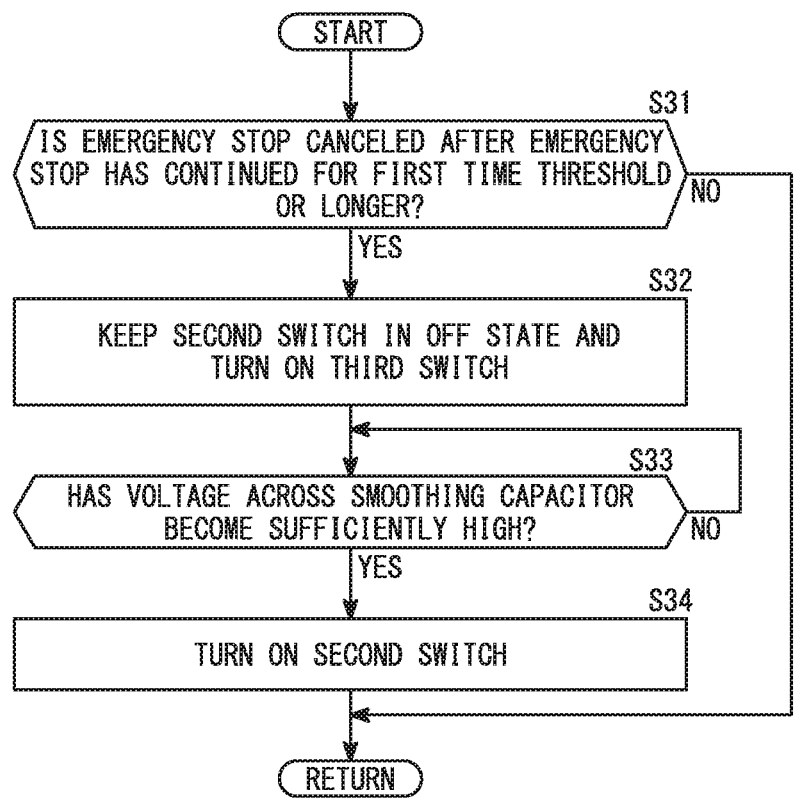
FIG. 9 is a flowchart showing an example of the operation of the motor drive device according to the embodiment.

An example of the operation of the motor drive device 10 when the emergency stop is canceled after the emergency stop has continued for the first time threshold TH1 or longer will be described with reference to FIG. 9. FIG. 9 is a flowchart showing an example of the operation of the motor drive device according to the present embodiment. In the example shown in FIG. 9, the switch unit 30 is turned off during an emergency stop.

At step S31, the control unit 60 determines whether or not the emergency stop is canceled after the emergency stop has continued for the first time threshold TH1 or longer. When the emergency stop is canceled after the emergency stop has continued for the first time threshold TH1 or longer (YES at step S31), the control proceeds to step S32. When the emergency stop is canceled before the lapse of the first time threshold TH1 (NO at step S31), the process shown in FIG. 9 is completed.

At step S32, the control unit 60 keeps the second switch 24 in the OFF state and turns on the third switch 18. As a result, current is supplied to the smoothing capacitor 22 via the second resistor 20. That is, the smoothing capacitor 22 is charged via the second resistor 20. Then, the control proceeds to step S33.

At step S33, the control unit 60 determines whether or not the voltage across the smoothing capacitor 22 has become sufficiently high. When the voltage across the smoothing capacitor 22 has become sufficiently high (YES at step S33), the control proceeds to step S34. When the voltage across smoothing capacitor 22 has not been sufficiently high (NO at step S33), step S33 is repeated.

At step S34, the control unit 60 turns on the second switch 24. When step S34 is completed, the process shown in FIG. 9 is completed.

Figure 10:
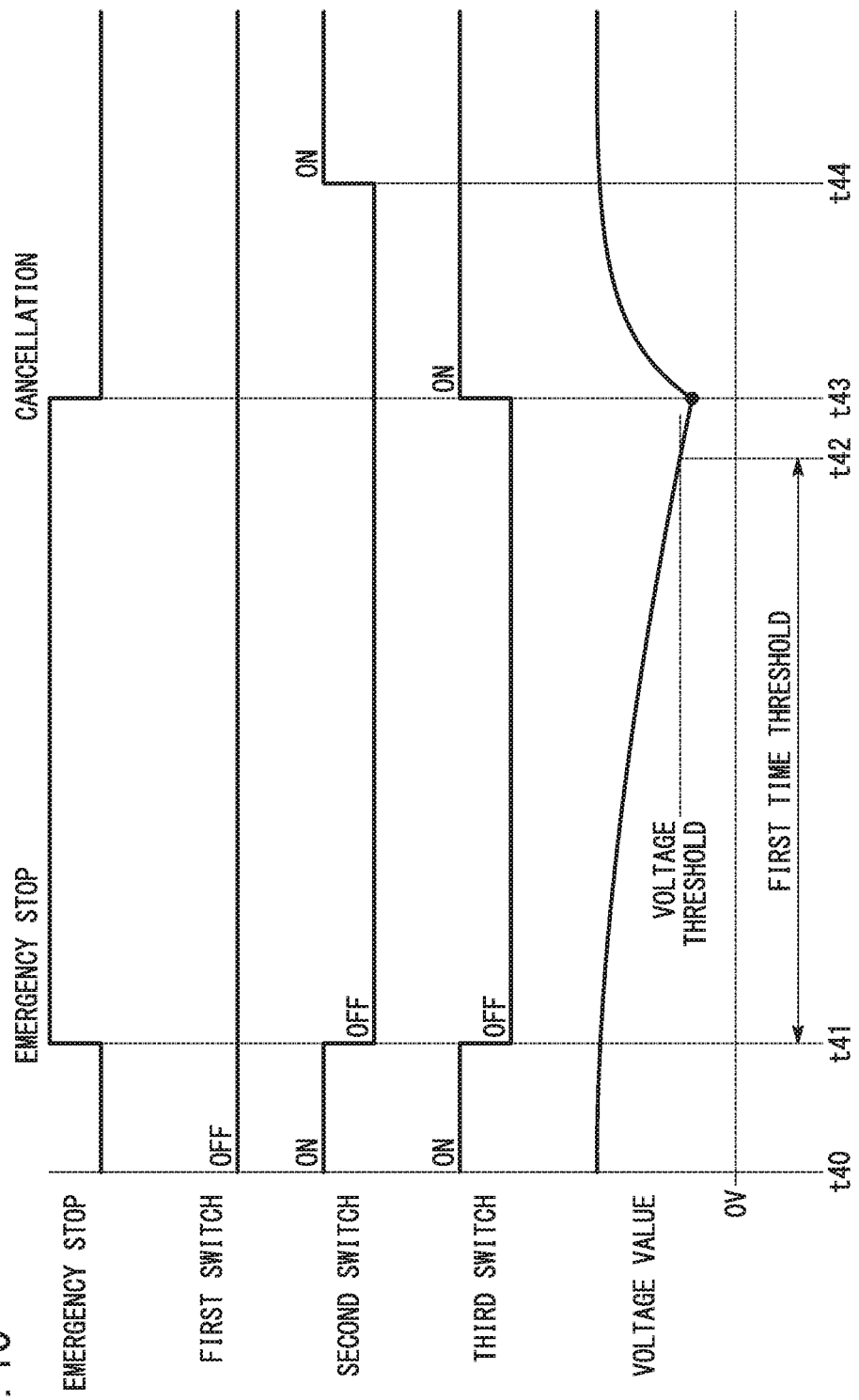
FIG. 10 is a time chart showing an example of the operation of the motor drive device according to the embodiment.

FIG. 10 is a time chart showing an example of the operation of the motor drive device according to the present embodiment. FIG. 10 corresponds to the operation shown in FIG. 9. FIG. 10 shows an example of the operation when the emergency stop is canceled after the emergency stop has continued for the first time threshold TH1 or longer.

At time t40, no emergency stop has been issued. At time t40, the first switch 52 is in the OFF state, while the second switch 24 and the third switch 18 are in the ON state.

Time t41 is the timing at which an emergency stop is started. As shown in FIG. 10, the first switch 52 is kept in the OFF state, and the second switch 24 and the third switch 18 are turned off.

Time t42 is the timing at which the first time threshold TH1 has elapsed from the start of the emergency stop.

Time t43 is the timing at which the emergency stop is canceled. In the example shown in FIG. 10, since the emergency stop is canceled after the emergency stop has continued for the first time threshold TH1 or longer, the third switch 18 is turned on.

Time t44 is the timing at which the voltage across the smoothing capacitor 22 becomes sufficiently high. When the voltage across the smoothing capacitor 22 becomes sufficiently high, the second switch 24 is turned on.

Figure 11:
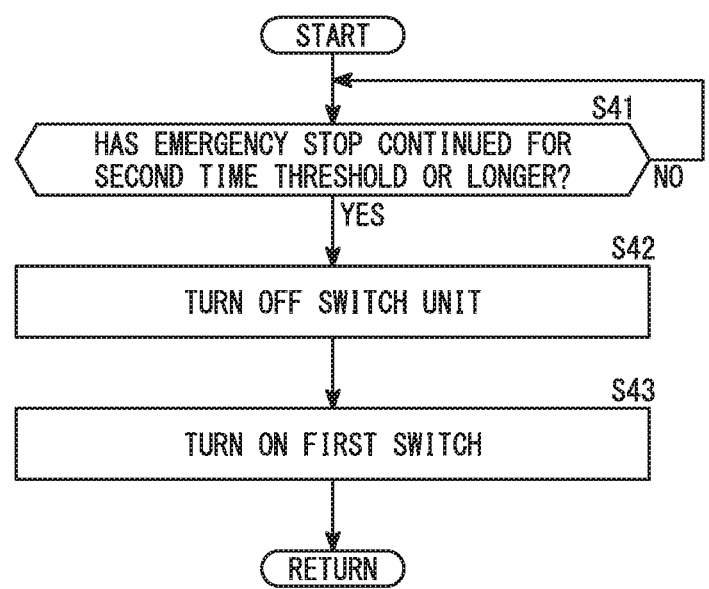
FIG. 11 is a flowchart showing an example of the operation of the motor drive device according to the embodiment.

Referring to FIG. 11, an example of the operation of the motor drive device 10 when an emergency stop has continued for the second time threshold TH2 or longer with the switch unit 30 kept on will be described. FIG. 11 is a flowchart showing an example of the operation of the motor drive device according to the present embodiment.

At step S41, the control unit 60 determines whether or not the emergency stop has continued for the second time threshold TH2 or longer. When the emergency stop has continued for the second time threshold TH2 or longer (YES at step S41), the control proceeds to step S42. When the emergency stop has not continued until the lapse of the second time threshold TH2 (NO at step S41), step S41 is repeated.

At step S42, the control unit 60 turns off the switch unit 30. That is, the control unit 60 turns off the second switch 24 and the third switch 18. Then, the control proceeds to step S43.

At step S43, the control unit 60 turns on the first switch 52. This causes discharge of the electric power accumulated in the smoothing capacitor 22. In this way, the process shown in FIG. 11 is completed.

Figure 12:
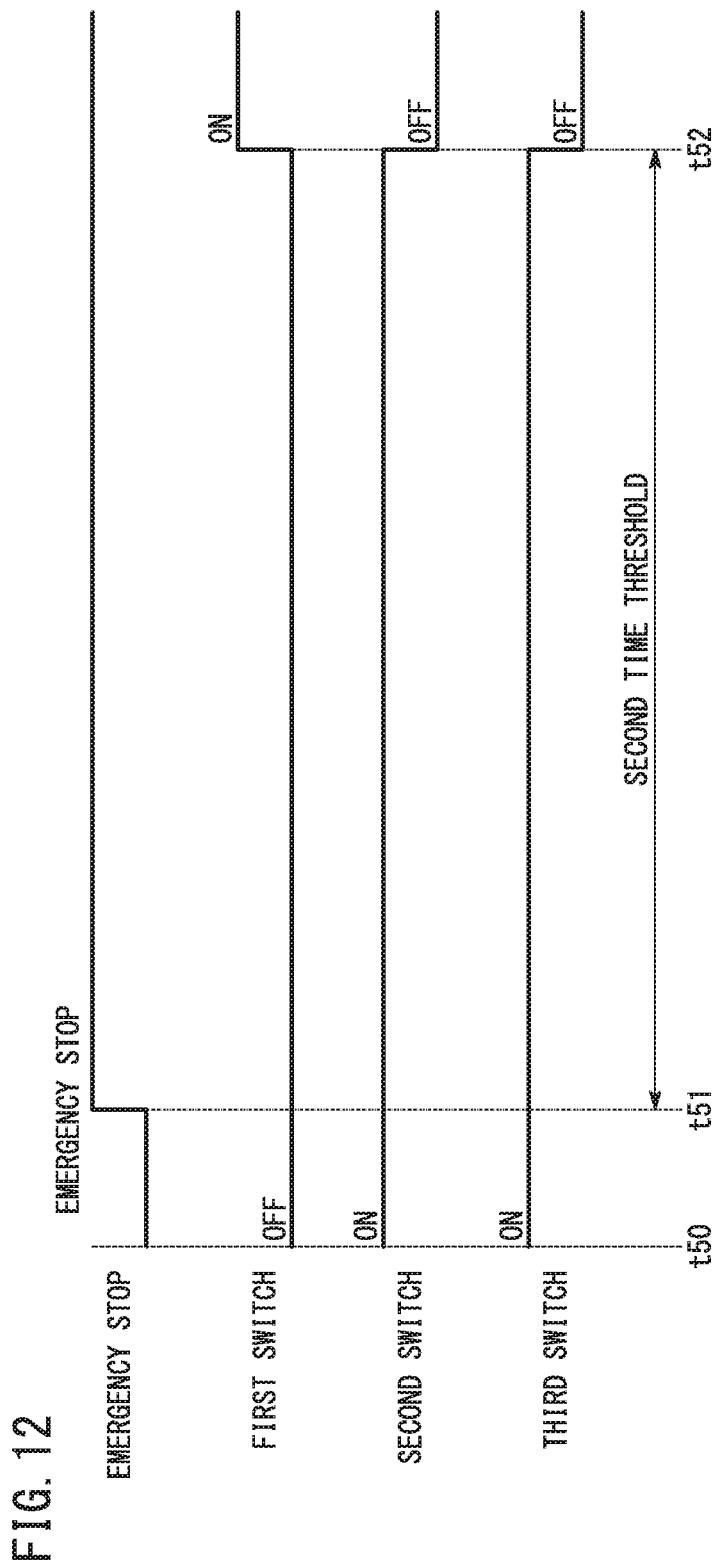
FIG. 12 is a time chart showing an example of the operation of the motor drive device according to the embodiment.

FIG. 12 is a time chart showing an example of the operation of the motor drive device according to the present embodiment. FIG. 12 corresponds to the operation shown in FIG. 11.

At time t50, no emergency stop has been issued. At time t50, the first switch 52 is in the OFF state, while the second switch 24 and the third switch 18 are in the ON state.

Time t51 is the timing at which an emergency stop is started. As shown in FIG. 12, the first switch 52 is kept in the OFF state while the second switch 24 and the third switch 18 are kept in the ON state.

Time t52 is the timing at which the second time threshold TH2 has elapsed from the start of the emergency stop. As shown in FIG. 12, the first switch 52 is turned on, and the second switch 24 and the third switch 18 are turned off.

Figure 13:
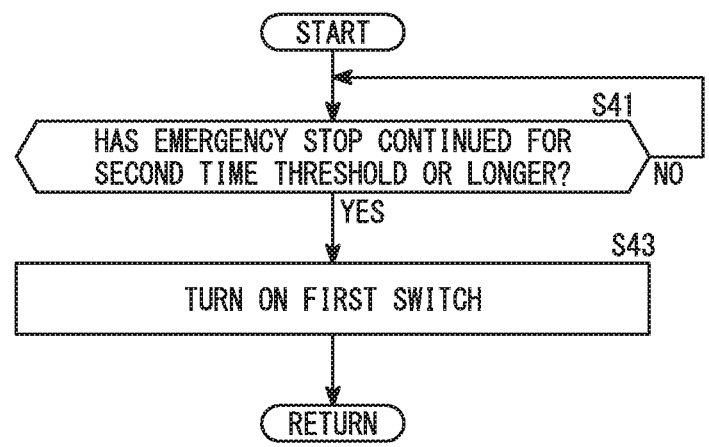
FIG. 13 is a flowchart showing an example of the operation of the motor drive device according to the embodiment.

Referring to FIG. 13, an example of the operation of the motor drive device 10 when the emergency stop has continued for the second time threshold TH2 or longer with the switch unit 30 turned off will be described. FIG. 13 is a flowchart showing an example of the operation of the motor drive device according to the present embodiment.

At step S41, the control unit 60 determines whether or not an emergency stop has continued for the second time threshold TH2 or longer. When the emergency stop has continued for the second time threshold TH2 or longer (YES at step S41), the control proceeds to step S43. When the emergency stop has not continued until the lapse of the second time threshold TH2 (NO at step S41), step S41 is repeated.

At step S43, the control unit 60 turns on the first switch 52. This causes discharge of the electric power accumulated in the smoothing capacitor 22. Thus, the process shown in FIG. 13 is completed.

Figure 14:
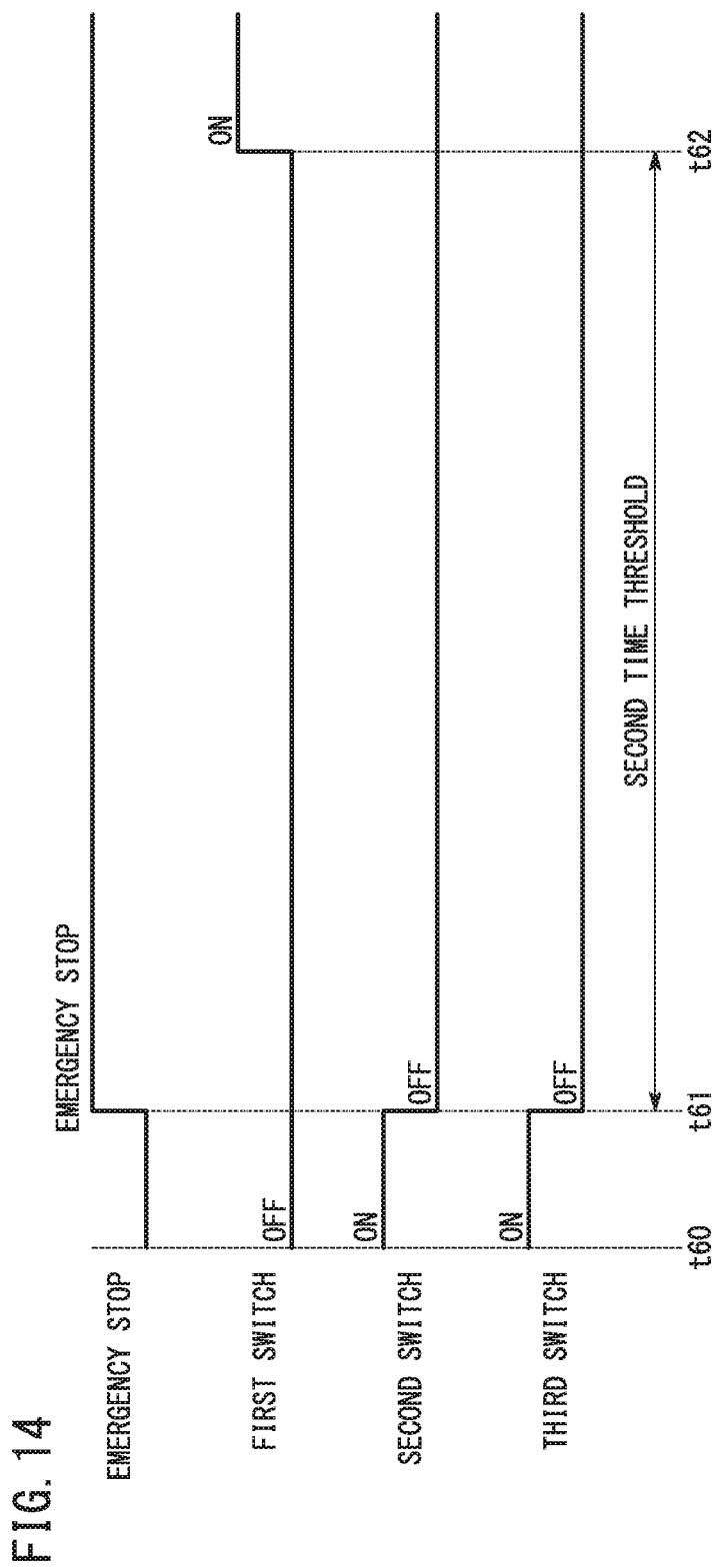
FIG. 14 is a time chart showing an example of the operation of the motor drive device according to the embodiment.

FIG. 14 is a time chart showing an example of the operation of the motor drive device according to the present embodiment. FIG. 14 corresponds to the operation shown in FIG. 13.

At time t60, no emergency stop has been issued. At time t60, the first switch 52 is in the OFF state, while the second switch 24 and the third switch 18 are in the ON state.

Time t61 is the timing at which an emergency stop is started. As shown in FIG. 14, the first switch 52 is kept in the OFF state, and the second switch 24 and the third switch 18 are turned off.

Time t62 is the timing at which the second time threshold TH2 has elapsed from the start of the emergency stop. As shown in FIG. 14, the first switch 52 is turned on and the second switch 24 and the third switch 18 are kept in the OFF state.

Figure 15:
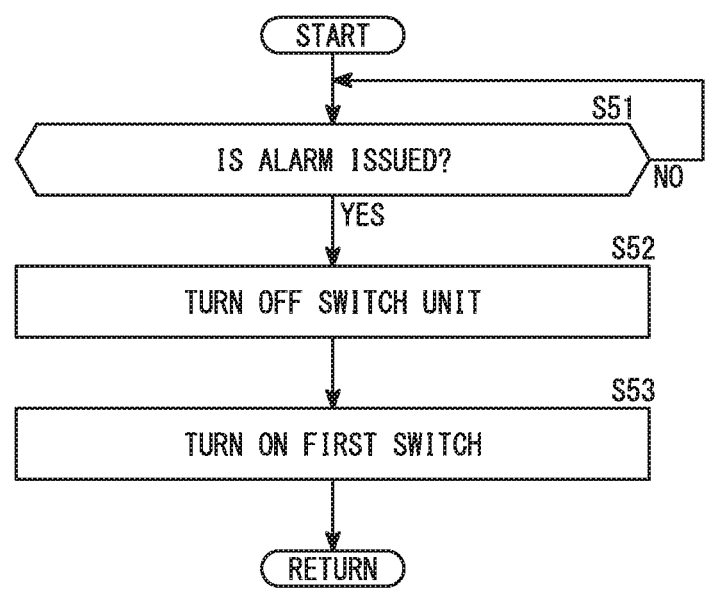
FIG. 15 is a flowchart showing an example of the operation of the motor drive device according to the embodiment.

Referring to FIG. 15, an example of the operation of the motor drive device 10 when an alarm is issued will be described. FIG. 15 is a flowchart showing an example of the operation of the motor drive device according to the present embodiment.

At step S51, the control unit 60 determines whether or not an alarm is issued. When the alarm is issued (YES at step S51), the control proceeds to step S52. When the alarm has not been issued (NO at step S51), step S51 is repeated.

At step S52, the switch unit 30 is turned off. That is, the control unit 60 turns off the second switch 24 and the third switch 18. Then, the control proceeds to step S53.

At step S53, the control unit 60 turns on the first switch 52. This causes discharge of the electric power accumulated in the smoothing capacitor 22. Thus, the process shown in FIG. 15 is completed.

FIG. 16 is a time chart showing an example of the operation of the motor drive device according to the present embodiment. FIG. 16 corresponds to the operation shown in FIG. 15.

At time t70, no emergency stop have been issued. At time t70, the first switch 52 is in the OFF state, while the second switch 24 and the third switch 18 are in the ON state.

Time t71 is the timing at which an alarm is issued. As shown in FIG. 16, an alarm is issued and an emergency stop occurs. Further, the first switch 52 is turned on, and the second switch 24 and the third switch 18 are turned off.

As described above, according to the present embodiment, the first switch 52 is kept in the OFF state during an emergency stop. Therefore, according to this embodiment, it is possible to prevent damage to the regenerative circuit 48 and the like.

Modification

Although the preferred embodiment of the present invention has been described above, the present invention is limited to the above embodiment, and various modifications can be made without departing from the gist of the present invention.

The above embodiment has been described by giving an example in which the switch unit 30 is configured by the second switch 24 and the third switch 18 which are disposed between the converter 14 and the smoothing capacitor 22, but the present invention is not limited to this. The switch unit 30 may be provided between the AC power supply 16 and the converter 14. In this case, the switch unit 30 can be configured by a magnetic contactor, a breaker, or the like. In this case, the third switch 18 connected in series with the second resistor 20 is not required. That is, in this case, the second resistor 20 is connected in parallel with the second switch 24 provided on the wiring 38P while the switch unit 30 is provided between the AC power supply 16 and the converter 14.

The above embodiment is summarized as follows.

A motor drive device (10) includes: a converter (14) configured to convert an AC voltage supplied from an AC power supply (16) into a DC voltage; a smoothing capacitor (22) configured to smooth the DC voltage output from the converter; an inverter (28) configured to convert the DC voltage smoothed by the smoothing capacitor into an AC voltage to drive a motor (12); a regenerative circuit (48) that is disposed between the smoothing capacitor and the inverter, includes a first resistor (50) and a first switch (52), and is configured to short-circuit the ends of the smoothing capacitor through the first resistor by turning on the first switch; and a control unit (60) configured to keep the first switch in an OFF state during an emergency stop. With this configuration, the first switch is kept in the OFF state during an emergency stop, so that damage to the regenerative circuit and the like can be suppressed even when the emergency stop function is frequently actuated.

The motor drive device may further include a switch unit (30) configured to turn on and off electric power supplied from the AC power supply to the smoothing capacitor, and the control unit may be configured to keep the switch unit in an ON state during the emergency stop so as to keep a state where a current is supplied from the converter to the smoothing capacitor. According to this configuration, the initial charging process becomes unnecessary after cancellation of the emergency stop, so that the motor can be quickly driven again. Further, since the switch unit is kept in the ON state, it is possible to prevent the switch unit from being damaged.

The motor drive device may further include a current detection unit (46) configured to detect a current supplied from the converter to the smoothing capacitor, and the control unit may be configured to turn off the switch unit so that no current is supplied from the converter to the smoothing capacitor and turn on the first switch when a current value detected by the current detection unit during the emergency stop is equal to or higher than a current threshold. According to this configuration, when a short-circuit failure occurs in the regenerative circuit or the inverter, it is possible to prevent the converter from continuously supplying a large current to the regenerative circuit or the inverter.

The motor drive device may further include a switch unit configured to turn on and off a current supplied from the AC power supply to the smoothing capacitor, and the control unit may be configured to turn off the switch unit at the time of the emergency stop so that no current is supplied from the converter to the smoothing capacitor.

The motor drive device may further include: a second switch (24) disposed between the converter and the smoothing capacitor; a second resistor (20) connected in parallel with the second switch and configured to suppress the current flowing into the smoothing capacitor; and a voltage detection unit (26) configured to detect a voltage across the smoothing capacitor, and the control unit may be configured to, when the emergency stop is canceled, turn on the second switch so that the current is supplied to the smoothing capacitor without passing through the second resistor when a voltage value detected by the voltage detection unit is equal to or higher than a voltage threshold, and keep the second switch in an OFF state so that the current is supplied to the smoothing capacitor through the second resistor when the voltage value detected by the voltage detection unit is lower than the voltage threshold. According to this configuration, the initial charging process can be omitted when the voltage value detected by the voltage detection unit is equal to or higher than the voltage threshold, hence the motor can be quickly driven again.

The motor drive device may further include: a second switch disposed between the converter and the smoothing capacitor; and a second resistor connected in parallel with the second switch and configured to suppress the current flowing into the smoothing capacitor, and the control unit may be configured to, when the emergency stop is canceled after the emergency stop has continued for a first threshold (TH1) or longer, keep the second switch in an OFF state to supply the current to the smoothing capacitor through the second resistor, and after the smoothing capacitor is charged through the second resistor, turn on the second switch to supply the current to the smoothing capacitor without passing through the second resistor.

The control unit may be configured to, when the emergency stop has continued for a second time threshold (TH2) or longer, turn off the switch unit so that no current is supplied from the converter to the smoothing capacitor, and turn on the first switch. This configuration makes it possible to discharge the electric power accumulated in the smoothing capacitor even when the user leaves after pressing the emergency stop button, hence can contribute to safety.

The control unit may be configured to, when the emergency stop has continued for a second time threshold or longer, keep the switch unit in the OFF state so as to keep a state where no current is supplied from the converter to the smoothing capacitor, and turn on the first switch. This configuration makes it possible to discharge the electric power accumulated in the smoothing capacitor even when the user leaves after pressing the emergency stop button, hence can contribute to safety.

The control unit may be configured to, when a predetermined alarm is issued, turn off the switch unit so that no current is supplied from the converter to the smoothing capacitor, and turn on the first switch. According to the configuration, the electric power accumulated in the smoothing capacitor is discharged when a predetermined alarm is issued, which can contribute to safety.

What is claimed is:

1. A motor drive device, comprising:
   a converter configured to convert an alternating current voltage supplied from an AC power supply into a direct current voltage;
   a smoothing capacitor configured to smooth the DC voltage output from the converter;
   an inverter configured to convert the DC voltage smoothed by the smoothing capacitor into an AC voltage to drive a motor;
   a regenerative circuit that is disposed between the smoothing capacitor and the inverter, includes a first resistor and a first switch, and is configured to short-circuit ends of the smoothing capacitor through the first resistor by turning on the first switch;
   a control unit configured to keep the first switch in an OFF state during an emergency stop; and
   a second resistor disposed between the converter and the smoothing capacitor, and configured to suppress a current flowing into the smoothing capacitor, based on a voltage across the smoothing capacitor; and
   a second switch disposed between the converter and the smoothing capacitor, wherein
      the second resistor is connected in parallel with the second switch and in series with a third switch, and
      the control unit is further configured to supply the current to the smoothing capacitor through the second resistor or independent of the second resistor.

2. The motor drive device according to claim 1, further comprising a switch unit configured to turn on and off electric power supplied from the AC power supply to the smoothing capacitor,
   wherein the control unit is further configured to keep the switch unit in an ON state during the emergency stop to keep a state where a current is supplied from the converter to the smoothing capacitor.

3. The motor drive device according to claim 2, wherein the control unit is further configured to, when the emergency stop has continued for a time threshold or longer, turn off the switch unit so that no current is supplied from the converter to the smoothing capacitor, and turn on the first switch.

4. The motor drive device according to claim 2, wherein the control unit is further configured to, when a predetermined alarm is issued, turn off the switch unit so that no current is supplied from the converter to the smoothing capacitor, and turn on the first switch.

5. The motor drive device according to claim 1, further comprising a switch unit configured to turn on and off the current supplied from the AC power supply to the smoothing capacitor,
   wherein the control unit is further configured to turn off the switch unit at a time of the emergency stop so that no current is supplied from the converter to the smoothing capacitor.

6. The motor drive device according to claim 5, further comprising:
   the second resistor connected in parallel with the second switch; and
   a voltage detection unit configured to detect the voltage across the smoothing capacitor,
   wherein the control unit is further configured to, when the emergency stop is canceled, turn on the second switch so that the current is supplied to the smoothing capacitor without passing through the second resistor when a voltage value detected by the voltage detection unit is equal to or higher than a voltage threshold, and keep the second switch in an OFF state so that the current is supplied to the smoothing capacitor through the second resistor when the voltage value detected by the voltage detection unit is lower than the voltage threshold.

7. The motor drive device according to claim 5, further comprising:
   the second resistor connected in parallel with the second switch,
   wherein the control unit is further configured to, when the emergency stop is canceled after the emergency stop has continued for a time threshold or longer, keep the second switch in an OFF state to supply the current to the smoothing capacitor through the second resistor, and after the smoothing capacitor is charged through the second resistor, turn on the second switch to supply the current to the smoothing capacitor without passing through the second resistor.

8. The motor drive device according to claim 5, wherein the control unit is further configured to, when the emergency stop has continued for a time threshold or longer, keep the switch unit in the OFF state so as to keep a state where no current is supplied from the converter to the smoothing capacitor, and turn on the first switch.

9. The motor drive device according to claim 1, further comprising a switch unit configured to turn on and off electric power supplied from the AC power supply to the smoothing capacitor,
   wherein the control unit is further configured to turn off the switch unit so that no current is supplied from the converter to the smoothing capacitor when a value of a current supplied from the converter to the smoothing capacitor during the emergency stop is equal to or higher than a current threshold.

10. The motor drive device according to claim 9, wherein the control unit is further configured to turn on the first switch when the value of the current during the emergency stop is equal to or higher than the current threshold.

11. The motor drive device according to claim 1, wherein the control unit is further configured to, when the emergency stop is canceled, turn on the second switch so that the current is supplied to the smoothing capacitor without passing through the second resistor when a value of the voltage across the smoothing capacitor is equal to or higher than a voltage threshold.

12. The motor drive device according to claim 11, wherein the control unit is further configured to, when the emergency stop is canceled, keep the second switch in an OFF state so that the current is supplied to the smoothing capacitor through the second resistor when the value of the voltage across the smoothing capacitor is less than the voltage threshold.

13. The motor drive device according to claim 1, wherein the control unit is further configured to, when the emergency stop is canceled after the emergency stop has continued for a time threshold or longer, keep the second switch in an OFF state to supply the current to the smoothing capacitor through the second resistor.

14. The motor drive device according to claim 1, wherein the control unit is further configured to, after the smoothing capacitor is charged through the second resistor, turn on the second switch to supply the current to the smoothing capacitor without passing through the second resistor.

15. The motor drive device according to claim 1, further comprising a switch unit configured to turn on and off electric power supplied from the AC power supply to the smoothing capacitor,
wherein the control unit is further configured to, when the emergency stop has continued for a time threshold or longer, turn off the switch unit so that no current is supplied from the converter to the smoothing capacitor, and turn on the first switch.

16. The motor drive device according to claim 1, further comprising a switch unit configured to turn on and off electric power supplied from the AC power supply to the smoothing capacitor,
wherein the control unit is further configured to, when the emergency stop has continued for a time threshold or longer, keep the switch unit in the OFF state so as to keep a state where no current is supplied from the converter to the smoothing capacitor, and turn on the first switch.

17. The motor drive device according to claim 1, further comprising a switch unit configured to turn on and off electric power supplied from the AC power supply to the smoothing capacitor,
wherein the control unit is further configured to, when a predetermined alarm is issued, turn off the switch unit so that no current is supplied from the converter to the smoothing capacitor, and turn on the first switch.

18. A motor drive device, comprising:
a converter configured to convert an alternating current voltage supplied from an AC power supply into a direct current voltage;
a smoothing capacitor configured to smooth the DC voltage output from the converter;
an inverter configured to convert the DC voltage smoothed by the smoothing capacitor into an AC voltage to drive a motor;
a regenerative circuit that is disposed between the smoothing capacitor and the inverter, includes a first resistor and a first switch, and is configured to short-circuit ends of the smoothing capacitor through the first resistor by turning on the first switch;
a control unit configured to keep the first switch in an OFF state during an emergency stop;
a switch unit configured to turn on and off electric power supplied from the AC power supply to the smoothing capacitor,
wherein the control unit is further configured to keep the switch unit in an ON state during the emergency stop so as to keep a state where a current is supplied from the converter to the smoothing capacitor; and
a current detection unit configured to detect a current supplied from the converter to the smoothing capacitor,
wherein the control unit is further configured to turn off the switch unit so that no current is supplied from the converter to the smoothing capacitor and turn on the first switch when a current value detected by the current detection unit during the emergency stop is equal to or higher than a current threshold.

* * * * *